June 6, 1950   A. A. SCHRAMM   2,510,524
APPARATUS FOR CAUSING VARIABLE FLOW
OF AIR IN TREATING ROOMS
Filed Nov. 14, 1947   2 Sheets-Sheet 1
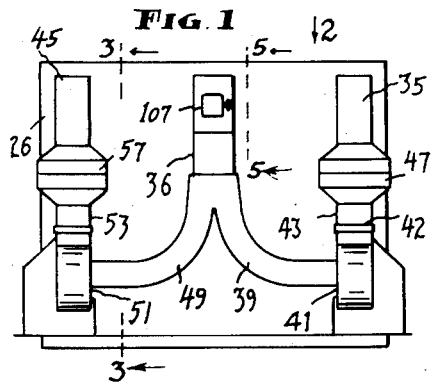
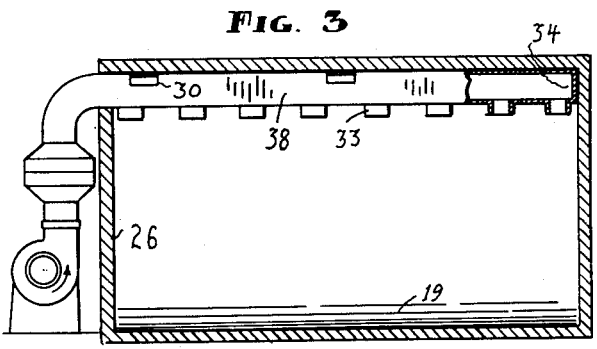
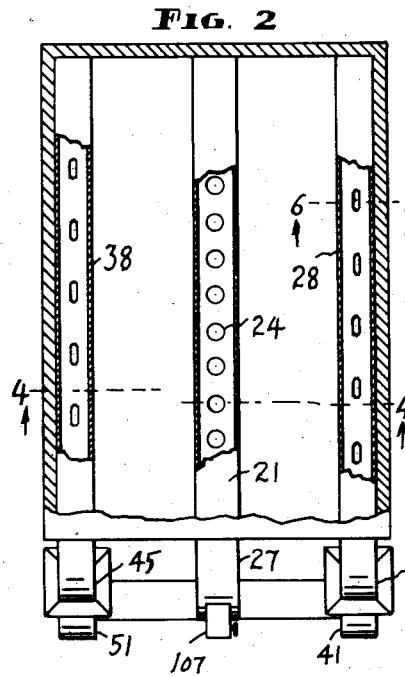
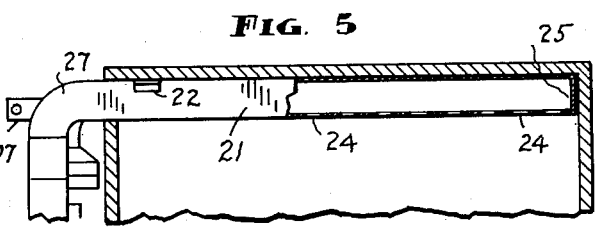
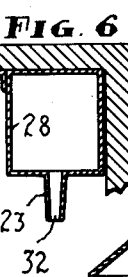
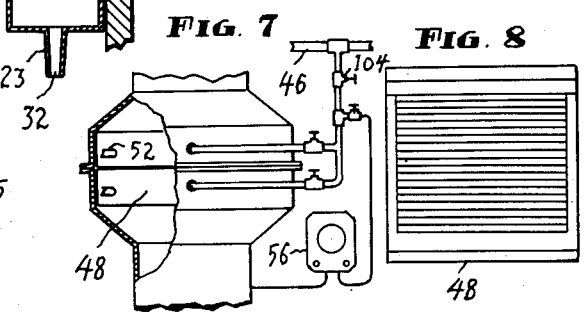
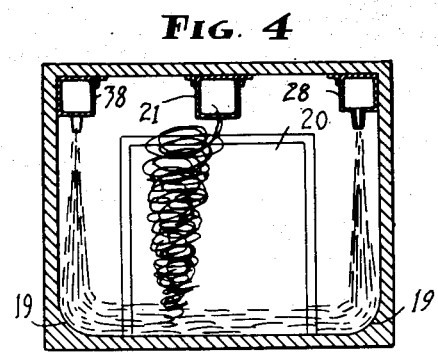
INVENTOR
ALEX A. SCHRAMM
ATTORNEY

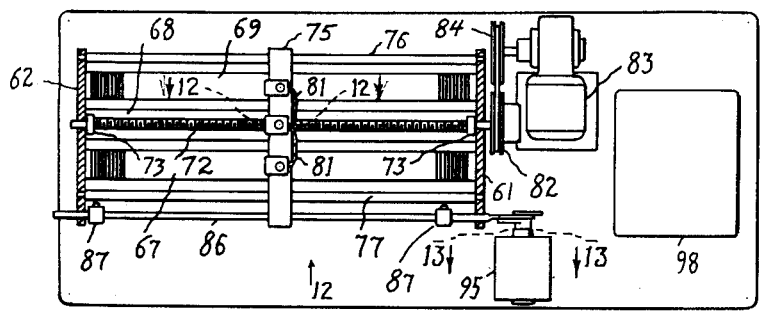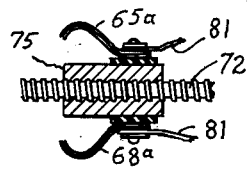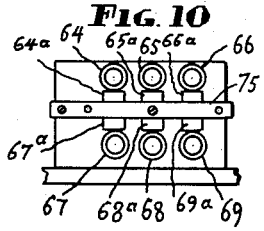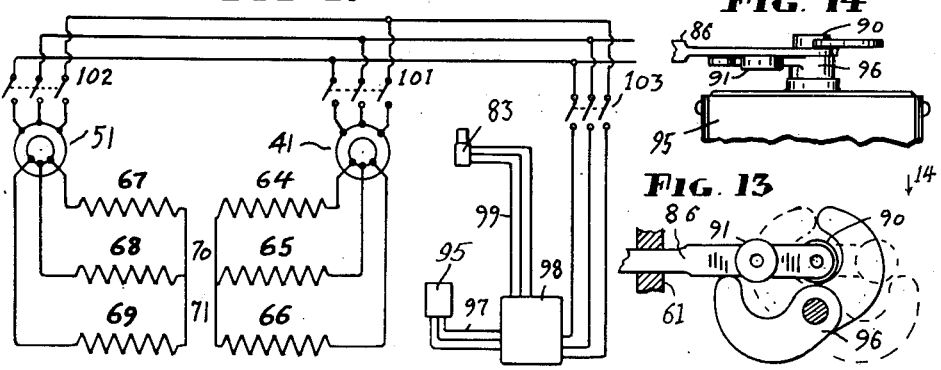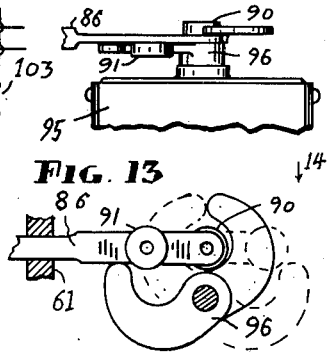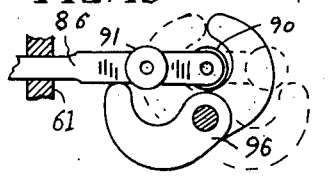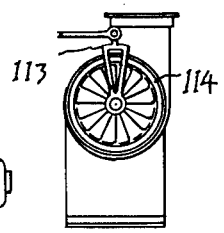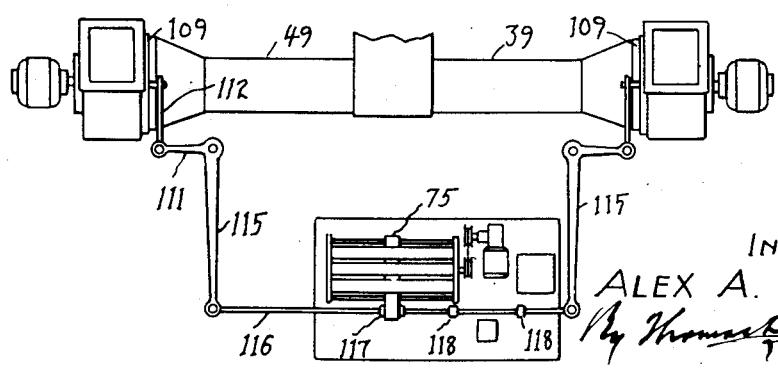

Patented June 6, 1950

2,510,524

UNITED STATES PATENT OFFICE 2,510,524

APPARATUS FOR CAUSING VARIABLE FLOW OF AIR IN TREATING ROOMS

Alex A. Schramm, Muncie, Ind.

Application November 14, 1947, Serial No. 786,027

4 Claims. (Cl. 98—33)

In procedures as hitherto practiced, in the treating of articles placed in a room or chamber appropriated therefor, for example, as in baking, cooking, cooling, drying and smoking, said procedures involving, as they do, the subjecting of the materials as foods, to the effects of the temperature of the air contained in the said room, there has long been experienced considerable difficulty and inconvenience due to inequalities and unevenness of the temperature of said room.

Accordingly there can be no certainty as to what, nor as to how much of the materials being handled will have been adequately or effectively treated.

Incident to the above named disadvantages, is impairment of some of the materials, and frequently complete loss of others. And moreover, there is resultant the necessity of rehandling and replacements, and involvement of increased material costs and operational expense.

To provide an apparatus whereby the temperature that is predetermined for the air of the room, may be uniformized and maintained in uniformized condition, is the object, broadly stated, of my invention.

The said general object, also other and particular aims, as will presently appear, which are devoted to features making the apparatus economical of construction, installation and operation, and durable and dependable, are accomplished by, and my invention is embodied in the new construction, combination and arrangement of parts described in the following specification and illustrated in the accompanying drawings.

The several parts of the invention, as same appear in the different views in the drawings, are identified by suitable characters of reference.

In the drawings,

Figure 1 is a front view of my invention as it appears in a typical embodiment intended for a treating room of conventional dimensions, for example, about fourteen feet in length, ten feet in width, and nine feet in height.

Figure 2 is a top plan view, in the direction of arrow 2 in Figure 1, the greater portion of the ceiling of the room being broken away.

Figure 3 is a longitudinal vertical sectional view, on the broken line 3—3, in the direction of arrow 3 in Figure 1.

Figure 4 is a vertical transverse sectional view taken on broken line 4—4, in the direction of arrow 4 in Figure 2, the diagrammatical lines therein indicating the directional movement of air currents.

Figure 5 is a vertical longitudinal sectional view taken on broken line 5—5 in the direction of arrow 5 in Figure 1, a portion of the wall of the air receiving chamber shown therein, being broken away.

Figure 6 is an enlarged cross section view, taken on broken line 6—6 in Figure 2.

Figure 7 is a diagrammatic side view of one of the heat exchanger devices and temperature controller, said device and controller being of conventional construction and function. In this view the enclosing casing is partially broken away, to disclose the heating surface composed as of two sections.

Figure 8 is a plan view of one of the surface sections, as in Figure 7, removed.

Figure 9 is a side view of electro-mechanical mechanism for controlling the velocities of the discharge of the air by the fans.

Figure 10 is a vertical cross section view, at broken line 10—10, in the direction of arrow 10 in Figure 9.

Figure 11 is a sectional top plan view, in broken line 11, in the direction of arrow 11 in Figure 9.

Figure 12 is an enlarged cross section view, in detail, taken on broken line 12—12 in the direction of arrow 12 in Figure 11.

Figure 13 is an enlarged cross section view, in detail, taken on broken line 13—13 in Figure 11.

Figure 14 is a top plan view, in the direction of arrow 14 in Figure 13.

Figure 15 is a diagram of the electric wiring.

Figure 16 is a diagramatical top plan view illustrative of a modification of my invention.

Figure 17 is a side view illustrative of a lever operated damper device for adjustable control of fan inlet, as in Figure 16.

A room or chamber of suitable character in connection with which my new apparatus is adapted for use is rectangular in plan, the base portions of the opposed longitudinal walls each being curved inwardly in the form of fillets 19. Suitable openings in an end wall of the room are provided with closure doors 20 which afford access for the disposing in, and for the removing from said room, vessels or racks containing or supporting the materials which are to be treated.

An elongated hollow structure, rectangular in cross section, made of sheet metal, and of length coextensive with the length of the room, is designated as air receiving chamber 21. It is secured at position at the ceiling midway between the side walls of the room, as by lag screws or bolts passed through angle clips 22 arranged at suitable locations. From end to end of the underside of said air receiving chamber are spaced holes designated as intakes 24. Wall 25 closes the rear end of said chamber 21. The forward end of said chamber is passed through the front wall 26 of the said room and it embodies a downwardly directed elbow 27.

At the ceiling and at the upper portion of each of the side walls of the room, is an elongated hollow structure, made of suitable air conducting material, as sheet metal. It is of length coextensive with the length of the room, and is of dimensions in cross section slightly less than the cross section dimensions of said air receiving chamber. It is secured in place as by lag screws passed through angle clips 30 at suitable locations. From end to end of these hollow structures, and which I designate as plenum chambers 28 and 38, are successively arranged longitudinal slots. At each of these slots is a downwardly directed nozzle, the parallel sides of which are convergent thereby providing a narrow mouth 32. 23 designates the nozzles of plenum chamber 28. 33 designates the nozzles of plenum chamber 38. The nozzles of one chamber are so spaced as to be in alternated or staggered relation to the nozzles of the other chamber. A wall 34 closes the rear end of each plenum chamber, and the forward end of each plenum chamber is passed through the frontal wall 26 of the said room, and it embodies a downwardly turned elbow.

Connected to the elbow 27 of said air receiving chamber is a downwardly directed part 36.

Connected to the part 36 of said air receiving chamber, is a duct consisting of a section 39 and a section 43. Each is rectangular in cross section. Section 39 is fashioned at its lower end to circular formation where it is connected to the inlet mouth of a fan 41. Section 43 is connected at its lower end to the outlet 42 of fan 41. It is enlarged at its upper portion to constitute a casing 47 within which is retained a heat exchanger. The said casing at its upper portion is connected to the elbow 35 of the adjacent plenum chamber 28.

Connected to the part 36 of said air receiving chamber, is a duct consisting of a section 49 and a section 53. Each is rectangular in cross section. Section 49 is fashioned at its lower end to circular formation where it is connected at its lower end to the inlet mouth of fan 51. It is enlarged at its upper portion to constitute a casing 57 within which is retained a heat exchanger. The said casing at its upper portion is connected to the elbow 45 of the adjacent plenum chamber 38.

The said duct sections, fans, and heat exchangers, while similar to each other respectively, in form and function, are described and identified separately for convenience presently, in explaining the operation of the invention.

Each of said fans is electric motor driven. Each is conventional.

The degree of temperature, with regard to the treating which is to occur in the room, is afforded by means of the heat exchangers. These devices being similar, reference thereto is made in the singular. Such device being well known as to construction and function, brief reference only, to same, is deemed necessary. It comprises surface units consisting of interrelated rectangular sections 48 which are supplied, as by steam through a pipe system including usual main 46, and return line 52. The said sections 48 function to change the degree of the temperature of the air that passes therethrough, and to discharge or output the air which has been so changed in temperature. In connection with each of said heat exchangers is a conventional installation comprising temperature recording instrument 56, and the usual piping therefor as indicated in Figure 7. It is responsive to the temperature of the incoming air, to maintain the temperature that is predetermined for the air put out; that is to say—the air that passes beyond the surface unit sections 48. The combination of this temperature-degree control installation with the heat exchanger is such that any degree of temperature that is predetermined for the air content of the room is had.

The said fans 41 and 51 function to draw air from the air content of the room through the air receiving chamber 21, ducts 39 and 49 and into the fans, whence it is propelled through the duct sections 43—53, heat exchangers, plenum chambers 28—38 and the nozzles thereof. My invention includes, in combination with the elements above described, means for controlling the velocity of the discharge through the nozzles of the plenum chamber, that is to say, for controlling the velocity of the air currents propelled by the fans. See Figures 9 and 14.

Supported by spaced opposed upright plates 61 and 62 which are secured to a suitable base or panel 65, are two sets of resistance coils, three in each set; one set being above the other. The coils of the upper set are indicated by the numerals 64, 65 and 66. The coils of the lower set are indicated by the numerals 67, 68, 69. Coils 64, 65, 66 are individually connected, by the wiring as indicated in Figure 15, to the three phases of the wound rotor of the motor of fan 41. Similarly, the coils 67, 68, 69 are individually connected to the phases of the wound rotor of the fan 51. Conductors 70 and 71 interconnect ends of the three coils of each of the sets, that are opposite to the ends that are connected to the rotor. The ends of coils 64, 65, 66 that connect to the wound rotor of motor 41, are opposite the ends of coils 67, 68, 69 that connect to the wound rotor of motor 51.

Journaled in bearings therefor in the said frame plates 61 and 62 at a plane parallel with and equidistant from said sets of coils, is a threaded drive shaft 72 which is retained against longitudinal movement, as by collars 73 secured thereto and which engage said plates. Said drive shaft is threaded through bore therefor in a cross member which I designate as shunt bar 75. The ends of this shunt bar are in slidable interconnection with longitudinal guide bars 76 and 77 which are secured at their ends to the said frame plates 61 and 62.

Carried by, but insulated from said shunt bar, at its top side, are brushes 64a, 65a, and 66a which are in engagement with the resistance coils 64, 65 and 66, respectively.

Carried by, but insulated from said shunt bar, at its bottom side, are brushes 67a, 68a and 69a which are in engagement with the resistance coils 67, 68 and 69. The said brushes for each set of coils are interconnected by conductors 81.

Secured to the end of drive shaft 72 is a pulley 82. Positioned adjacent thereto is a three phase ratio motor 83 with its pulley 84 belted to said pulley 82. The power thus transmitted causes rotation of the threaded drive shaft 72 at a given rate of speed.

One of the said pulleys, namely pulley 82, being adjustable in pitch diameter, the speed rate of shaft 72 may be adjusted.

Supported loosely in holes provided therefor in the frame plates 61 and 62, and in parallelism with said guide bars, is a push rod 86. Spaced set-collars 87, adjustable to desired positions on said push rod, are in the path traversed by the said shunt bar 75, as indicated in Figure 11 of the drawings. At a location adjacent to said push rod, and suitably mounted on said base plate 65, is a conventional snap action double throw limit switch 95 having operating arm 96 of double cam type as shown in detail in Figures 13 and 14. The said push rod embodies at the opposite sides of the flattened end portion thereof, studs 90 and 91. The positions of these studs, with relation to the said operating arm of the limit switch are as indicated in Figure 13 and Figure 14, one stud being in advance of the other, whereby upon a movement of the push rod from either one of two positions, the said operating arm is moved from one to the other of its two positions, thereby the said switch being operated. Connected to said limit switch, as by the wiring 97 is a conventional magnetic reversing starter 98 which, in turn, is in wired connection 99 with the ratio motor 83.

Coincident with the engagement by said shunt bar as it nears the end of each stroke, with one or the other of said set-collars 87 there is (through the engagement by one or the other of said studs 90—91) actuation of operating arm 96, throw of the limit switch, and reversing of the motion of the ratio motor. Accordingly with the reciprocative travel of the shunt bar, the brushes thereof in constant contact with the resistance coils there is the regular increase of resistance in the coils of one fan circuit, and the regular decrease of resistance in the coils of the other fan circuit.

By the electro-mechanical organization described, when the resistance in the circuit of one fan is decreasing, the resistance in the circuit of the other fan is increasing. Accordingly, the speed of one of the fan motors is accelerating while the speed of the other fan motor is decelerating.

It is this performance of the electro-mechanical organization that makes possible the new and peculiar control of flow of air currents whereby the temperature in the room may be made and maintained uniform and equable.

Resultant of the control of the speed of operation each, of said fans, so that when one fan is operating at minimum speed and the other is operating at maximum speed, (both fans operating at the same speed when midway between minimum and maximum), there is obtained a differentiation of velocity of air discharge from the nozzles of one of the plenum chambers, from the velocity of the air discharge from the nozzles of the other plenum chamber. Accordingly the air volume which is displaced by the downward currents from the nozzles at the opposite sides of the room, is caused to move transversely, its mass at the zone of intermingling being deflected upwardly consisting of directly intermingling whirling columns, each of form of an inverted cone. Deflection, at the lower zone of the room, of the downward flow of the air discharge through the nozzles, is facilitated by the fillets 19 and 19 at the bases of the opposite walls of the room. Incident to the effect of the differentiating velocities of the downward currents from the said nozzles, is the movement of said mass volume from side to side. Resultant of the above described performance of the air currents and the movement of said mass, is the composing of differentiating temperatures, and of differentiating densities, the temperature of the total air content of the room thereby being rendered and maintained uniform.

The heat exchangers, provided as they are, with temperature control installations, and therefore being responsive to any rise or fall of the room-contained air, the temperature of the air which enters the heat exchangers is automatically modified so that the predetermined temperature for the air content of the room is restored.

*Operation*

Upon closing the switches 101—102, the circuits through the three phase motors are closed and the fans 41—51 are in operation in the direction of arrow in Figure 3.

Closing of switch 103 sets in motion the ratio motor 83 and the drive shaft 72 (see Figure 11), the shunt bar 75 thereby being moved along its guidebars.

The operator now opens valve 104 of the main 46 (see Figure 7), then sets the controller 56 for the degree desired for the room temperature. After a period of a few minutes, the desired degree of room temperature will have been obtained.

The room temperature being in readiness, there is brought and suitably supported at suitable height in the room, about twenty-four to thirty inches, in vessels or upon racks, the material to be treated. Then the gasketed door or doors 20 are closed.

By reason of the suction operating through the intakes of the air receiving chamber, and of the propulsion operating through the nozzles of the plenum chambers, and of the effect thus had on the room air content, as hereinbefore described, the temperature of the room is uniformized and the treated material is equably affected throughout.

The invention is useful in activities as in baking, cooking, drying, cooling, curing and smoking. Whether the temperature of the room is high in degree or low in degree, with relation to the temperature of the product as introduced into the room, the differentiating velocities of discharge from the plenum chambers are operative to uniformize and to maintain uniform the temperature of the air content of the room. In procedures involving smoking the material, there is utilized an inlet fitting and damper 107 disposed in the elbow 27 of the air receiving chamber, and to which said fitting attachments may be made for receiving smoke from any suitable source.

My invention is adaptable to situations where there are used fans of the type having adjustable inlet opening control (see modification indicated in Figure 16); that is to say—dampers each having means operable to vary the degree of opening of the fan inlet, as by a lever arm operable between two positions. In such adaptation, the ends of the duct sections 39—49 are altered to fitting connection with the circular flanges 109 of the inlets of said fans. Bell cranks suitably fulcrumed at locations adjacent to said fans have their weight arms 111 pivotally connected to rods 112 which in turn are pivotally connected to the lever arms 113 of the dampers 114. Interconnecting the power arms 115 of said bell cranks by pivotal connections is a reach rod 116. At an intermediate position on said reach rod is a suitable connection, as by set collars 117 with the shunt bar 75 which is operable as hereinbefore described. Trip lugs 118 set at adjusted positions on said reach rod perform the function of actuating the limit switch 95 at regular intervals. The ratio motor in turn, through threaded shaft 72 moves the shunt bar. Thus there is obtained, by varying the degree of opening of the fan inlet, a simultaneous lessening of the velocity of air propulsion by one fan, and increasing of the velocity of air propulsion by the other fan.

While in the typical embodiment of my invention herein illustrated and described, details of preferred form and arrangement are shown, I wish it to be understood that modifications may be made within the scope of the invention as it is defined in the claims, without departing from the spirit of my invention or sacrificing any of its advantages.

1. Apparatus of the kind described comprising a treating room, an air receiving chamber to receive air from said room and located adjacent to the ceiling thereof, plenum chambers spaced from said air receiving chamber and at the side walls of said room and provided with successively arranged downwardly directed nozzles, a duct interconnecting the air receiving chamber and one of the plenum chambers, a second duct interconnecting the air-receiving chamber with the other of said plenum chambers, separate air blowers connected to each of the ducts, means to control the rate of air flow through said blowers, actuating means for said control means, and means interconnecting said actuating means to simultaneously and reversely actuate said control means to increase flow through one duct and decrease flow through said second duct.

2. Apparatus of the kind described comprising a treating room, an air receiving chamber to receive air from said room and located adjacent to and which is of length coextensive with the ceiling of said room and is provided with successively arranged intakes, plenum chambers spaced from said air receiving chamber and at the side walls of said room and of length coextensive therewith and provided with successively arranged downwardly directed discharge nozzles, a duct interconnecting the air receiving chamber and one of the plenum chambers, a second duct interconnecting the air receiving chamber with the other of said plenum chambers, a heat exchanger device in each duct, separate air blowers connected to each of said ducts, means to control the rate of air flow through the said blowers, actuating means for said control means, and means interconnecting said actuating means to simultaneously and reversely actuate the said control means to increase flow through one duct and to decrease flow through the said second duct.

3. The invention as defined in claim 2 in which said actuating means for said control means includes an electric motor, and said means interconnecting said motor includes a double pole switch and a magnetic reversing starter.

4. Apparatus for providing temperature of predetermined degree desired for the air content of a treating room and for maintaining uniformity of said temperature throughout the room, consisting of and in combination with the room, an elongated air receiving chamber to receive air from said room and positioned in the upper zone of said room and of length coextensive therewith and provided at its under side with successively spaced intakes, plenum chambers spaced from said air receiving chamber and in parallelism therewith in the upper zone of said room, and provided with successively spaced downwardly directed nozzles, a duct interconnecting the air receiving chamber and one of the plenum chambers, a second duct interconnecting the air receiving chamber with the other of said plenum chambers, a heat exchanger device in each of said ducts operable to provide temperature of the degree desired for the air content of said room, separate air blowers connected to each of said ducts, means to control the rate of air flow through said blowers, actuating means for said control means, and means interconnecting said actuating means to simultaneously and reversely actuate said control means to increase flow through one duct and decrease flow through the second duct.

ALEX A. SCHRAMM.

REFERENCES CITED

The following references are of record in the file of this patent:

UNITED STATES PATENTS

| Number | Name | Date |
| --- | --- | --- |
| 1,167,844 | Rush | Jan. 11, 1916 |
| 1,451,747 | Tiemann et al. | Apr. 17, 1923 |
| 1,599,797 | Stacey | Sept. 14, 1926 |
| 1,791,498 | Halliburton et al. | Feb. 10, 1931 |
| 2,006,018 | Goodall | June 25, 1935 |
| 2,380,428 | Gilliam | July 31, 1945 |